United States Patent [19]

Ruether

[11] 4,102,778

[45] Jul. 25, 1978

[54] METHOD AND APPARATUS FOR CARRYING OUT HYDROGENATION REACTIONS

[76] Inventor: John A. Ruether, Les Bisets 153, Rue de Verviers, 54500 Vandoeuvre, France

[21] Appl. No.: 675,342

[22] Filed: Apr. 9, 1976

[30] Foreign Application Priority Data

Apr. 10, 1975 [CA] Canada .................................. 224274

[51] Int. Cl.² ....................... C10G 23/02; C10G 23/16
[52] U.S. Cl. .................................. 208/143; 23/288 R; 252/466 R; 252/466 PT
[58] Field of Search ....................... 208/143; 260/683.9

[56] References Cited

U.S. PATENT DOCUMENTS

| | | | |
|---|---|---|---|
| 2,331,915 | 10/1943 | Kirkpatrick | 208/143 |
| 2,918,425 | 12/1959 | Berger et al. | 208/143 |
| 3,275,545 | 9/1966 | McCall | 208/27 |
| 3,485,887 | 12/1969 | Kronig et al. | 260/683.9 |
| 3,751,515 | 8/1973 | Zadra | 208/143 |
| 3,775,291 | 11/1973 | Sze | 208/143 |
| 3,900,388 | 8/1975 | Hilfman | 208/143 |
| 4,039,430 | 8/1977 | Jensen | 208/143 |

FOREIGN PATENT DOCUMENTS 815,069  6/1969  Canada .................................. 208/143

*Primary Examiner*—Herbert Levine
*Attorney, Agent, or Firm*—Watson, Cole, Grindle & Watson

[57] ABSTRACT

This invention comprises a method of achieving a highly efficient use of catalyst in conducting hydrogenation reactions of hydrocarbons in the liquid state by means of solid catalysts. The catalyst is wholly contained in a microporous layer no thicker than 200 microns deposited on the outside surface of otherwise inert support particles. The catalyst particles, of the order of 10 mm diameter, are contained in a fixed, vertical, packed bed, and are brought into contact with the liquid hydrocarbon and hydrogen by passing the two fluids in cocurrent flow, either upwards or downwards, through the bed at substantially greater gas velocities than are usually employed in fixed bed catalytic reactors used for hydrogenating hydrocarbons in the liquid state. The effect of the high gas velocity is to achieve substantially higher heat and mass transfer rates among the three phases (catalyst, liquid hydrocarbon, and gaseous hydrogen) than are achievable under conventional conditions of operation of fixed bed catalytic reactors used for hydrogenating hydrocarbons in the liquid state. The combined effects of the high gas velocity and the mode of deposition of the catalytically active components on the catalyst support, are the achievement of a large global reaction rate in the reactor, combined with a high internal effectiveness factor for the catalyst. For fast hydrogenation reactions, for which the invention is most advantageously employed, a comparable efficiency of catalyst utilization can at present be achieved only by using catalyst in the form of powder or granules so small as to preclude their use in a fixed bed reactor.

4 Claims, 7 Drawing Figures

METHOD AND APPARATUS FOR CARRYING OUT HYDROGENATION REACTIONS

BACKGROUND OF THE INVENTION

Field of the Invention

This invention relates to a new means of carrying out hydrogenation of hydrocarbons in the liquid stage in the presence of a solid catalyst.

DESCRIPTION OF THE PRIOR ART

Catalytic hydrogenations of hydrocarbons may be carried out, in general, with the hydrocarbon in either the vapor state, or in both vapor and liquid states. A reaction is carried out with hydrocarbon in the liquid state when operation at the temperature required to convert it completely to a vapor would have undesirable and uneconomic consequences, such as the occurrence of undesired side reactions. When liquid hydrocarbon is present, a reaction system results that contains three phases: The solid catalyst, a liquid phase comprising hydrocarbon with some dissolved hydrogen, and a gaseous phase comprising hydrogen and hydrocarbon vapors.

One of two basic approaches is generally employed for effecting hydrogenation in the presence of liquid hydrocarbons with a solid catalyst; one is by means of the trickle-bed reactor and the other by means of the slurry reactor. When using the trickle-bed reactor the catalyst is prepared in the form of particles typically on the order of 5 mm diameter, and these particles are placed as a fixed bed in a vertical tubular reactor. The hydrocarbon feed enters the reactor above the top of the bed of catalyst particles, and the liquid is allowed to trickle down through the catalyst bed. The desired hydrogen partial pressure in the reactor may be maintained without circulation of hydrogen through the catalyst bed, or the hydrogen may be circulated through the bed in either cocurrent or countercurrent flow with the liquid hydrocarbon.

It is most common industrial practice to operate trickle-bed reactors used for hydrogenating hydrocarbons with cocurrent gas and liquid flow. The superficial velocity of the liquid phase is commonly in the range 0.07 – 2.7 cm/s. (This is the velocity calculated under the assumption that the entire cross sectional area of the reactor is available to flow). A typical value of the superficial gas velocity, comprising hydrogen and hydrocarbon vapor, is 1.6 cm/s. Under these conditions of gas and liquid flow rates there is no notable interaction between the two phases in the reactor. The flow of liquid over the catalyst particles proceeds largely as it would if there were no gas flow whatever.

Consequently the coefficients for interphase transport of heat and mass in the reactor are of the same order of magnitude as would result if there were no gas circulation. If higher flow rates of gas were used, the coefficients for interphase transport would increase, but increased operating cost to overcome the additional pressure drop across the catalyst bed would also result. In usual industrial practice such higher gas flow rates are not used because they would not result in a significant increase in reaction rate. This is because the rate determining processes occur within the catalyst particles, and are not directly affected by flow conditions external to the particles. The rate determining processes are diffusional transport of reactants and products within the catalyst particles, and chemical adsorption and reaction on the interior surface of the microporous catalyst particles.

When the rate-determining processes occur within the catalyst particles, the extent of reaction is governed by the length of time the reactants are in contact with the catalyst. Two common measures of this contact time are the "space time" and its reciprocal, the "space velocity". When the rate-determining processes occur within the catalyst particles, it is not necessary to specify superficial gas and liquid velocities since these only influence transfer processes external to the catalyst particles. Thus, in this case, operating flow conditions are often specified by giving the space velocity for the reactor.

For faster reactions, processes governing the rate of transfer of chemical species and heat between the bulk liquid and the catalyst surface, in addition to processes occurring within the catalyst particles, determine the rate of reaction. The rates of transfer processes between the bulk liquid and the catalyst surface are strongly influenced by the gas and liquid superficial velocities. In the case of fast reactions it is not sufficient to characterize operating flow conditions solely by the space velocity, since space velocity does not determine superficial velocity. Space velocity characterizes operating flow conditions as they apply to processes occurring within the catalyst; superficial velocity characterizes operating flow conditions as they apply to processes external to the catalyst. Since this invention is concerned with fast reactions in fixed bed reactors, it is necessary to specify superficial and space velocities to characterize operating flow conditions.

Where there are increasingly fast reactions, i.e. reactions with increasing values of the kinetic rate constant, resistance within catalyst particles to diffusion of reactants and products becomes an important problem in the operation of trickle-bed reactors. The inner portions of the catalyst particle are not useful, because the reactant has been consumed before it can diffuse to the central core of the catalyst particle. This is an undesirable condition, since the catalyst is not being well utilized. The catalyst is said to have a low internal effectiveness factor.

Principally to avoid operating with a low internal effectiveness factor, fast three-phase reactions are usually conducted with catalyst in such finely divided form that it cannot be utilized as a fixed bed. The magnitude of the pressure drop encountered in operating with finely divided particles in the form of a fixed bed is such as to make this form of process commercially unattractive. Instead the catalyst may be suspended in the liquid. This is the second basic approach in effecting three-phase hydrogenation reactions. In the case of the suspended, or ebullated bed reactor, the catalyst particles are of such size, e.g. on the order of 1000 microns, that their movement in the liquid is somewhat restricted. For very fast three-phase reactions, however, it is necessary to operate with the catalyst in still more finely divided form to achieve a high internal effectiveness factor. Reactors that operate with the catalyst in the form of a powder, e.g. with particle diameters on the order of 100 microns, are called slurry reactors. The size of catalyst particles used in suspended bed reactors and in slurry reactors may overlap.

In slurry reactors used in hydrogenations a number of means can be used to effect good contact between the gas and liquid phases, and to keep the catalyst uniformly suspended in the liquid. These include use of a mechanical agitator in a vessel containing the liquid and catalyst, with the gas in the head space above the liquid; use of a pump whereby liquid is continuously withdrawn, circulated in an external loop, and returned to the reactor; use of gas lift, by which hydrogen is bubbled into the liquid at the bottom of the reactor. Because of the small particle size, catalyst movement is unrestricted within the liquid phase in a slurry reactor.

Also due to the small catalyst particle size, for fast three-phase reactions higher internal effectiveness factors are achieved with slurry reactors than with other kinds.

Another effect of the small catalyst particle size in a slurry reactor is that the particle-liquid coefficients for interphase transport of heat and mass are higher than those achieved using conventional operating conditions in trickle-bed or ebullating bed reactors.

In spite of the advantages of slurry reactors just referred to, slurry reactors have certain disadvantages compared to trickle-bed or ebullating bed reactors. To separate the catalyst from the liquid product a filter must be used, which incurs additional capital and operating expense. With the catalyst in a powder form, the rate of catalyst loss is higher than in other reactors that use catalyst in the form of larger particles. Catalyst replacement costs are therefore higher. If the presence of small amounts of catalyst in the product seriously degrades product quality, the slurry reactor may be impractical.

Another disadvantage of the slurry reactor arises from the mixing of the liquid phase within the reactor. Because of the agitation used to achieve catalyst suspension in the liquid and good contact between the gas and liquid phases, the liquid contents tend to be mixed to a uniform composition throughout the reactor. If the slurry reactor is operated in the continuous mode, i.e. fresh liquid feed is added continuously and liquid product is withdrawn from the reactor continuously, the composition of the liquid product stream is essentially equal to that of the liquid contents everywhere in the reactor. Continuous operation of a reactor with this kind of mixing is referred to as "back-mix flow".

In contrast, the liquid phase mixes much less in passage through a trickle-bed reactor. The liquid tends to move through the catalyst bed without extensive mixing in the direction of flow. Though there is some mixing, the passages of the liquid through the bed approximates the idealized condition of no mixing, called "plug flow".

It is known in the art of chemical reactor design that when a high conversion of a reaction of the type, reactant A goes to product B(A→B), economy of the reactor volume required can be achieved if the flow pattern approximates plug flow rather than back mix flow. Consider also reactions of the form, reactant A goes to desired product B, but B may further react to give undesired product C. (A→B→C). It is again known to practitioners of the art that in such a case the reaction can be most advantageously carried out if the flow pattern approximates plug flow rather than back-mix flow.

It is an object of the present invention to achieve internal effectiveness factors, for catalysts used in fast three-phase hydrogenation reactions, of a magnitude that at present are achievable only with powder catalyst, as employed with slurry reactors, but in the new process to avoid high rates of catalyst loss and the need for filters such as are associated with slurry reactor operation.

It is another object of the present invention to achieve, for three-phase hydrogenation reactions, rates of interphase transport (between the gas and liquid, and between the liquid and solid) of such magnitude as at present are achieved only in hydrogenations carried out in slurry reactors.

It is another object of the present invention to accomplish the first two objects in a reactor in which the flow pattern for the liquid approximates plug flow, instead of back-mix flow.

SUMMARY OF THE INVENTION

Two key features of this invention are the provision of catalyst particles consisting of a support body coated with catalytic material, and the particular mode of catalyst deposition on the support. Refractory material of the support body may be of such materials as zirkite, cohart, or mullite, or it may be particles of quartz, fused alumina, or stones. Metallic particles or balls may also be used. In general the support material should be of palpable particulate form as distinguished from finely divided powders, and it may have the physical shape of pellets, tablets, spheres, rings, saddles, and the like, or it may be irregular in shape such as might be obtained from conventional grinding and screening operations. Generally the support particles should be in the size range about 5-30 millimeters. The term "catalyst particle" as used herein in describing and claiming this invention should be understood to include catalyst supported on any material of the above described form and size, whether of regular or irregular shape.

The catalyst is deposited as a thin microporous film about the external surface of the support particle, and it is only in this film that catalytically active material is to be found on a support particle. Let the side of the microporous film that is bonded to the support particle be called the inside of the film and the opposite side be called the outside. For most efficient use of the catalytically active material, the outside of all portions of the microporous layer should have direct access to the bulk fluid phase in which the support particle is immersed. That is, it should not be necessary for reactants and products to diffuse through pores in the support particle to reach any part of the microporous layer. Agitation of the bulk fluid phase in which the support particle is placed should cause a movement and flow of the fluid past the outside of the microporous layer.

If a porous catalyst support particle is used, it is advantageous to avoid depositing the microporous layer containing catalyst upon interior surface of the support particle. Catalyst deposited on the interior surface of the support would be used less efficiently, i.e. would exhibit a lower internal effectiveness factor, than catalyst deposited at the external surface of the support particle.

The efficiency of catalyst utilization increases, as indicated by an internal effectiveness factor that more closely approaches unity, as the thickness of the catalytically active layer about the support particle becomes smaller. The preferred thickness of the layer containing catalyst is less than 200 microns. Thicker layers may be used, but the internal effectiveness factor is thereby reduced. This mode of catalyst preparation, in which all catalytically active material is within 200 microns of the external surface of the catalyst particle, may be contrasted with the usual mode of catalyst preparation for use in fixed beds of particles. In the latter case the overwhelming majority of active catalytic sites are greater than 200 microns from the external particle surface.

There are means of establishing a thin layer of catalyst near the external surface of a support particle other than by deposition of a microporous layer of material. Such other means are not claimed in the invention. For instance, often catalysts are prepared by dissolving metallic salts in a liquid, and impregnating microporous support particles with this solution. Subsequent treatment causes the metallic salt to deposit on the interior surface of the support and to assume its catalytically active form. By known means it is possible to have the metal salts deposited preferentially in the vicinity of the external surface of the support particle, and not uniformly throughout the particle.

The means of catalytic preparation claimed for use in this invention is believed to be superior for several reasons. Firstly, it does not require the use of a microporous support particle. The microporous layer may be deposited on porous or non porous supports. Secondly the method allows for better control of the depth of catalytically active component from the external surface. It is possible to assure that the catalytically active component is only in the deposited layer, and to control the thickness of this layer. Thirdly, it is possible to achieve a more uniform distribution of the catalytically active component within the catalyst-bearing layer.

As an example of the mode of catalyst deposition utilized in this invention, in the case where the catalyst is one or more of the platinum metals, i.e. platinum, palladium, rhodium, ruthenium, osmium, and iridium, the catalyst particles may be prepared as follows. Salts of the metals may be dissolved in an aqueous solution also containing a colloidal dispersion of alumina. The support particles may be dipped in this mixture, resulting in a thin microporous coat of alumina containing a salt of the catalytic metal being deposited on the support. The salt of the platinum metal or metals is subsequently reduced to give the metals in a highly dispersed form. The technique of preparing supported metal catalysts in this way is described, for example in a technical bulletin of the Continental Oil Company, Park-Eighty Plaza East, Saddle Brook, N.J., U.S.A., for use of their product sold under the trade name "Dispal" alumina.

As another example of the mode of catalyst deposition utilized in this invention, in the case where the catalyst is Raney nickel, the catalyst particles may be prepared as follows. To the surface of a metal support particle is applied a mixture consisting of pulverulent supporting skeleton material, and a pulverulent Raney nickel alloy. The application is effected by pressing or rolling, followed by sintering the composite part at temperatures in excess of 400° C. Subsequently the particle is activated by treating it with a caustic solution or acid to dissolve out the soluble component of the Raney alloy. This method of preparation has been described in Canadian Pat. No. 644,910, August Winsel and Edward Justi, July 17, 1962.

In the invention, the catalytic particles form a fixed bed in a vertical tubular housing. To hydrogenate a hydrocarbon, the hydrogen and liquid feed are passed in rapid cocurrent flow, either upwards or downwards, through the bed of catalyst particles. It is important to specify that the flow rate of gas employed in the invention is significantly higher than that conventionally employed with trickle-bed reactors. The minimum superficial gas velocity needed to achieve the strong interaction between the two fluid phases that is central to this invention is approximately 30 cm/s for both upflow and downflow. In addition to the hydrogen flow required to provide turbulence in the liquid, sufficient hydrogen must also be provided to satisfy the consumption by reaction. Thus through most of the catalyst bed the superficial gas velocity will normally be considerably greater than 30 cm/s. Depending on the stoichiometry of the reaction (moles of hydrogen consumed per mole of liquid feed), the hydrocarbon feed rate, the temperature and pressure in the reactor, and the vapor pressure of the hydrocarbon reactants and products, the superficial gas velocity could be as large as several meters per second at the point of entry of the feed to the catalyst bed. By way of contrast, a typical superficial gas velocity for a conventional trickle-bed reactor with cocurrent flow is 1.5 cm/s.

The higher gas flow rate employed in the invention compared to the operation of a trickle-bed reactor causes a strong interaction between the gas and liquid phases. The gas phase acts to propel the liquid phase through the catalyst bed with greatly increased liquid phase turbulence compared to the situation at lower gas flow rates. All the coefficients governing interphase transport of heat and mass in the reactor are greatly increased due to the liquid phase turbulence. The coefficients of interphase transport are significantly higher in the invention than are achieved with the conventional operation of a trickle-bed reactor.

Because of the way the catalyst is deposited on the support particles, a high internal effectiveness factor results even with the relatively large interphase transport coefficients that obtain.

The flow pattern of liquid in the invention being described, both in cocurrent upward and cocurrent downward flow, approximates plug flow.

It is the combination of the mode of deposition of the catalyst in a thin layer about the support particles, together with the operating conditions for gas and liquid flow velocities that produce high liquid turbulence with approximately plug flow of liquid, which constitutes the essence of the invention.

A general description of the operation of the invention is as follows. The catalyst particles are charged to the reactor and form a fixed bed, supported by a porous plate or grid. In the case of cocurrent upward flow there is also a porous plate or grid at the top of the catalyst bed to insure that no particles are entrained by the flowing fluids. If the catalyst particles require in situ activation, this activation is performed before beginning to conduct the desired hydrogenation reaction.

When the catalyst particles are in the proper state to catalyze the hydrogenation reaction to be performed, hydrogen gas and hydrocarbon liquid flow is begun to the reactor. The hydrogen and liquid hydrocarbon enter the reactor via a distributor located either at the top or bottom of the reactor, depending on whether flow is cocurrent downward or cocurrent upward, respectively. The hydrogen and hydrocarbon pass through the catalyst bed, during which passage the hydrogenation reaction takes place. At the opposite end of the catalyst bed from where the fluid streams enter, the fluid streams pass out of the section containing catalyst and into a gas-liquid disengagement section.

A gas stream, containing predominatly hydrogen, is removed from the gas-liquid separator, sent to a gas compressor, and recycled to the distributor via which the gas and liquid feeds enter the reactor. The function of the compressor is to bring the gas pressure back up to the desired value at the reactor inlet after the pressure drop that occurs in passage through the catalyst bed. Make-up hydrogen is added to the recycle gas stream at a rate equal to that of its consumption in the reactor. Make-up may be added either upstream or downstream of the compressor in the gas recycle loop.

A stream of liquid containing the hydrocarbon product is also removed from the gas-liquid disengagement section.

Temperature and pressure in the reactor may be maintained at values giving the best result for the particular reaction being conducted. Temperature in the reactor may be controlled by any convenient means, as for instance by use of a coolant in a heat transfer jacket.

It is to be recalled that only a thin layer of solid at the outside of the catalyst particles is catalytically active. A liquid space velocity in the invention may be described based on the volume of catalytically active solid. Thus defined the liquid space velocity is the volume of liquid feed per volume of catalytically active solid per hour. Depending on the particular reaction being conducted, and the temperature and pressure employed, the space velocity in the invention may range between 25 - 1000 $hr^{-1}$. By way of contrast, in a conventional trickle-bed reactor the entire catalyst pellet is catalytically active, so space velocity is usually defined on the basis of unit volume of catalyst bed. Trickle-bed reactors usually operate with liquid space velocities in the range of 1 - 12 $hr^{-1}$.

As stated earlier, a suitable gas superficial velocity is a value greater than or equal to about 30 cm/s. Suitable liquid superficial velocities fall in the range of about 0.5 - 6 cm/s. These values apply to both cocurrent upward and cocurrent downward operation.

DESCRIPTION OF THE DRAWINGS

For a better understanding of the invention reference should be made to the drawings which are diagramatic illustrations of preferred embodiments of the invention for hydrogenation of liquid hydrocarbons. Referring specifically to the drawings.

DESCRIPTION OF THE PREFERRED EMBODIMENTS

Figure 1:
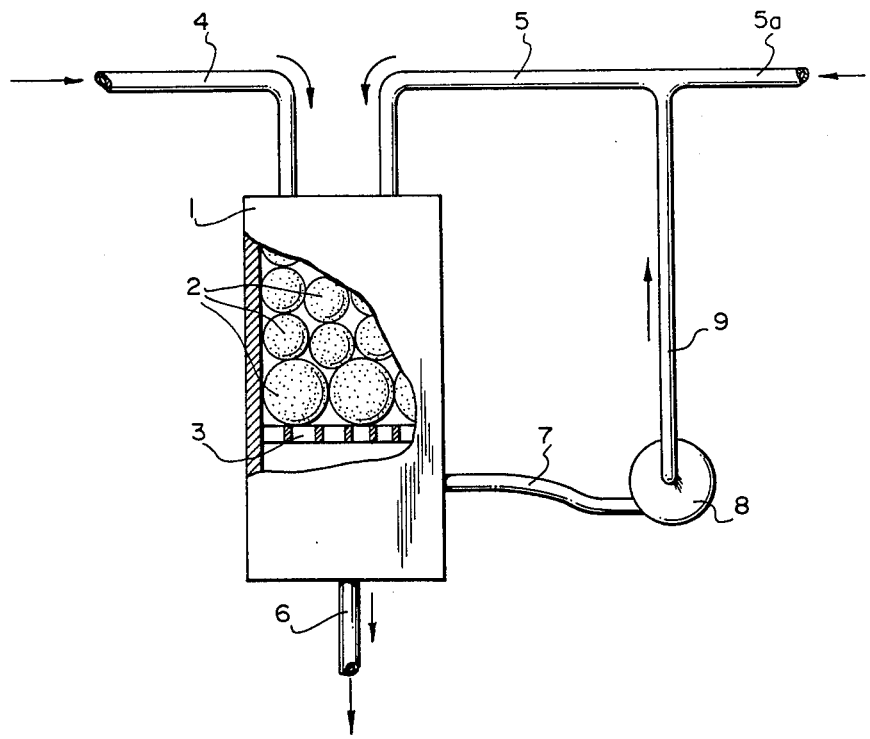
FIG. 1 shows an elementary form of an embodiment of the invention in order to explain the principle of the same.

Referring first to FIG. 1 where a very elementary form of the embodiment of the invention is shown, the reactor is shown at 1. Inside the reactor is a fixed bed of solid catalyst which consists of a layer of catalyst particles each denoted by 2 held in place in the reactor by means of a perforated support denoted by 3. It is contemplated that the substances taking part in the reaction will descend from the top of the reactor 1 toward the bottom of the reactor 1 and will flow in contact with catalyst particles 2 where reaction will take place.

It should be emphasized that FIG. 1 is merely a very elementary form of the preferred embodiment of the invention and in a practical form of the invention there would be a large number of catalyst particles 2 forming a bed through which the substances taking part in the reaction pass.

Moreover, not only would the catalyst particles 2 normally be present in large numbers but the entire reactor would in some cases be duplicated in parallel channels as will be discussed in connection with FIGS. 5 and 7.

It is contemplated that a liquid hydrocarbon will be reacted in reactor 1 with hydrogen gas to form a hydrogenated product. Shown at 4 is a tube through which the hydrocarbon liquid enters the reactor 1. The tube shown at 5 is the passage through which the hydrogen gas enters the reactor 1. It is contemplated that the hydrocarbon liquid and the hydrogen gas will be intermixed above the catalyst particles 2 and reaction will take place in the region of the catalyst particles 2 forming the hydrogenated product which will flow out of the reactor through the tube denoted by 6.

It is comtemplated that the liquid hydrocarbon and hydrogen gas will not only be fed to the reactor, but will be fed at such rate that turbulence occurs in the reactor in the region of the catalyst particles 2.

It is contemplated that the hydrogen gas will be fed to the reactor 1 through tube 5 and part only of such hydrogen gas will be reacted and the balance will exit through a tube denoted by 7 and be recycled by means of a compressor denoted by 8. Connection is made from compressor 8 to tube 5 by means of a tube denoted by 9. Make-up hydrogen gas would enter tube 5 at the place denoted by 5a on FIG. 1.

Figure 2:
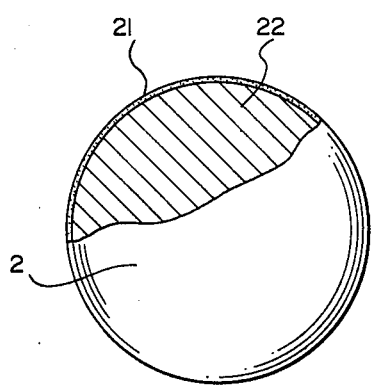
FIG. 2 shows a partly cross-sectional view of a typical catalyst particle as denoted by reference numeral 2 in FIG. 1.

Referring now to FIG. 2 in connection with the details of the catalyst particles, the catalyst particle 2 shown in FIG. 2 is in the form of a generally spherical body, although numerous other shapes may be used. On the surface of the catalyst particle 2 is a catalytically active layer denoted by 21. In order to emphasize the function of the catalytic particle, the interior is denoted as the inert support member 22 and upon inert support member 22 is thinly coated the catalytically active layer 21. Thus the hydrocarbon liquid and the hydrogen gas taking part in the reaction are brought into close association with the catalytically active layer 21, causing the reaction to take place. Such reaction will occur throughout the bed at the surfaces of the various catalytic particles 2.

Figure 3:
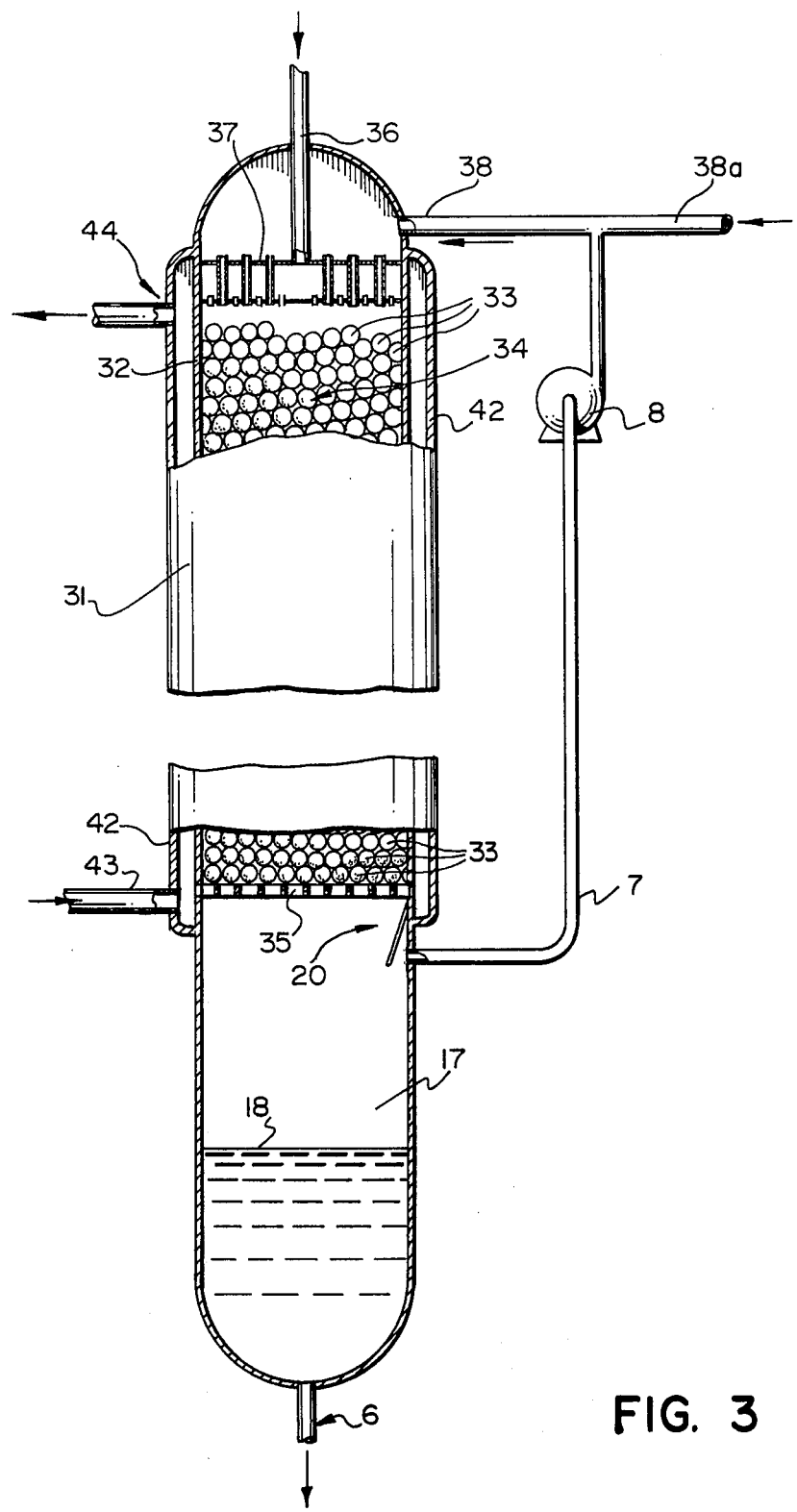
FIG. 3 shows a practical form of the embodiment of the invention wherein there is a downward flow of the substances taking part in the reaction.

Reference is now made to FIG. 3, in which the reactor vessel is now denoted as 31. Reactor 31 is basically a single tube denoted by 32 packed with catalyst particles 33 which may be similar to catalyst particle 2, and in which cocurrent downward flow is utilized. The catalyst particles 33 are formed into a catalyst bed denoted by 34 contained in a reactor vessel 31. The catalyst bed 34 is supported on a porous plate or grid shown at 35. Liquid hydrocarbon feed enters through a conduit denoted by 36 at the top of the reactor 31 and passes through a distributor indicated by 37. Gaseous hydrogen also enters near the top of the reactor through a conduit shown at 38 and passes through the distributor 37, using a different set of passageways through the distributor 37 than those followed by the liquid feed. The purpose of the distributor 37 is to provide an even distribution of the liquid hydrocarbon feed and hydrogen gas across the entire cross section of catalyst bed 34. The design of distributor 37 is not critical to the operation of the invention, since the passage of the liquid hydrocarbon and hydrogen through the catalyst bed 34 itself tends to distribute the two fluids evenly within the depth of a few catalyst particles from the top of the bed.

In the same manner as shown in FIG. 1, there is a tube or conduit 7 (which may be called the hydrogen recycle conduit) and compressor 8, and the make-up hydrogen gas will be supplied at 38a.

The hydrogen and hydrocarbon pass down through the catalyst bed 34 into a gas-liquid disengagement section denoted by 17. The liquid level shown at 18 in the disengagement section 17 is maintained below conduit 7 used to recycle hydrogen gas. An inclined baffle shown at 20 placed over the point of entry of the hydrogen recycle conduit 7 through the wall of tube 32 keeps falling liquid from entering the conduit 7. Gas in the hydrogen recycle conduit 7 is passed through the compressor 8 and thence back into the reactor 31. Make-up hydrogen is fed to the reactor at 38a at a rate equal to the rate of consumption of hydrogen by reaction in the reactor 31. Liquid product of the reaction is removed at the bottom of the disengagement section via conduit 6 as in FIG. 1.

In conducting hydrogenation reactions that are highly exothermic, heat may be removed by providing a heat transfer jacket and by passing a coolant between the reactor vessel wall of reactor tube 32 and the heat transfer jacket wall indicated by 42. Any convenient coolant may be used, such as circulating a liquid whose sensible heat increases in passing through the jacket, or feeding to the jacket a liquid which is allowed to vaporize, and removing the vapor. Coolant enters and leaves the jacket via conduits shown at 43 and 44, respectively.

Figure 4:
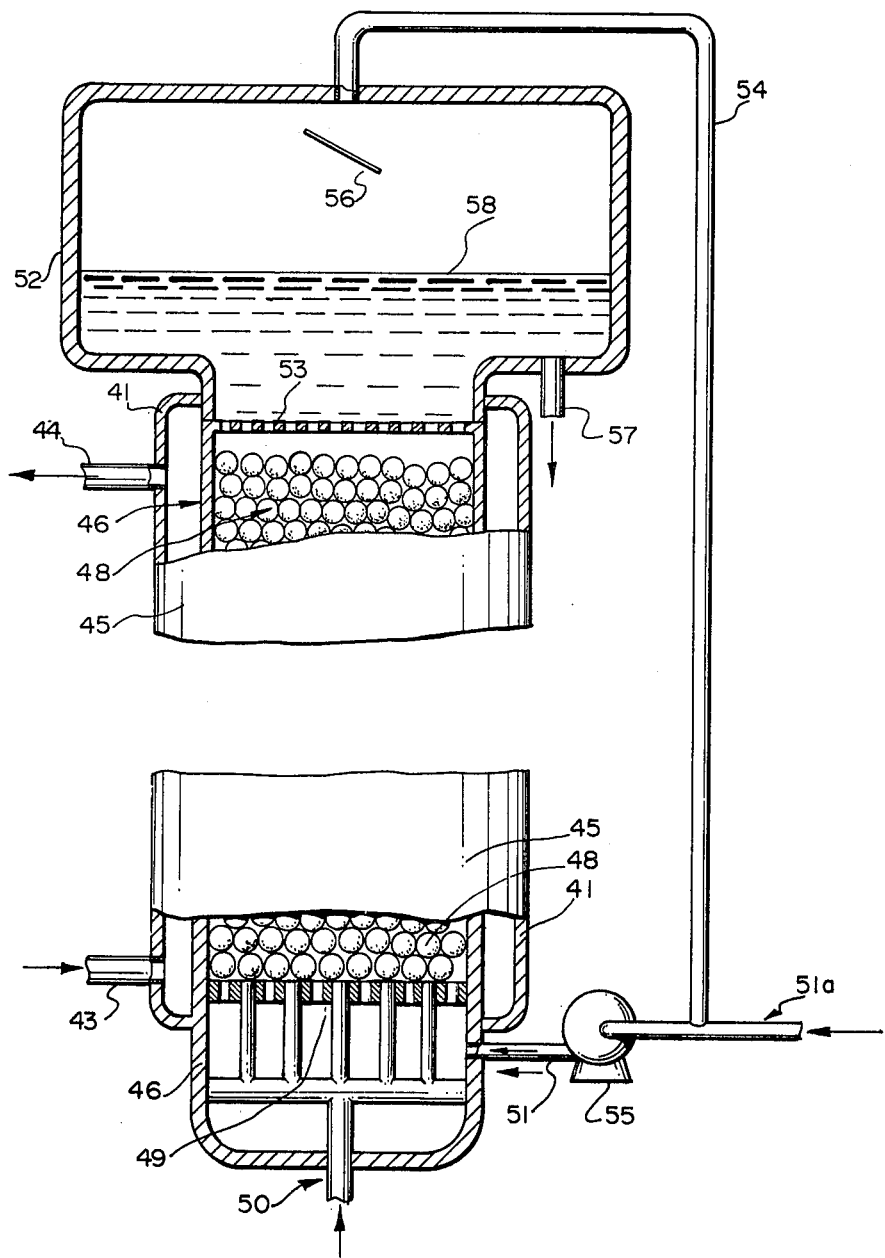
FIG. 4 is an embodiment of the invention similar to that shown in FIG. 3 except the flow of the substances taking part in the reaction is in an upwardly direction.

A second preferred embodiment of the invention is shown in FIG. 4, in which a single vessel is provided with a catalyst bed, and in which cocurrent upward flow is utilized. The reactor, now denoted as 45, again makes use of a reactor tube denoted by 46, and a coolant jacket denoted by 41, and other parts not now specifically referred to are basically the same as in the apparatus of FIG. 3. The catalyst bed now shown at 48 is again contained in a reactor vessel. In the present embodiment of the invention, however, support of the catalyst bed is provided by the distributor for the hydrocarbon and hydrogen feeds, indicated by 49. The distributor 49 operates similarly to distributor 37 in FIG. 3. It would also be possible to support the catalyst bed with a grid such as is shown at 35 in FIG. 3, with the distributor 49 immediately beneath it. Liquid hydrocarbon feed enters the distributor through conduit shown at 50, and hydrogen feed enters through conduit denoted by 51. A large number of small holes are provided for both the hydrogen and liquid feeds in the upper surface of the distributor 49 uniformly spaced across the cross section area of the tube containing the catalyst bed.

The gas and liquid streams flow upwards through the catalyst bed 48 at length entering the gas-liquid disengagement section denoted by 52. A porous plate or grid indicated at 53 at the top of the catalyst bed insures that no catalyst particles are carried by the fluids into the disengagement section 52. Hydrogen is removed at the top of the disengagement section 52 through conduit shown at 54 and passes through a compressor denoted by 55 before reentering the reactor. Make-up hydrogen enters the hydrogen recycle loop via a conduit shown at 51a. An inclined baffle plate denoted by 56 placed beneath the opening from the disengagement section 52 to conduit 54 prevents liquid entrainment with the recycle gas stream.

Liquid product is removed through conduit indicated at 57 at the lower surface of the disengagement section 52. The liquid level shown at 58 in the disengagement section 52 is maintained sufficiently high that no gas or vapor leaves through conduit 57.

Figure 5:
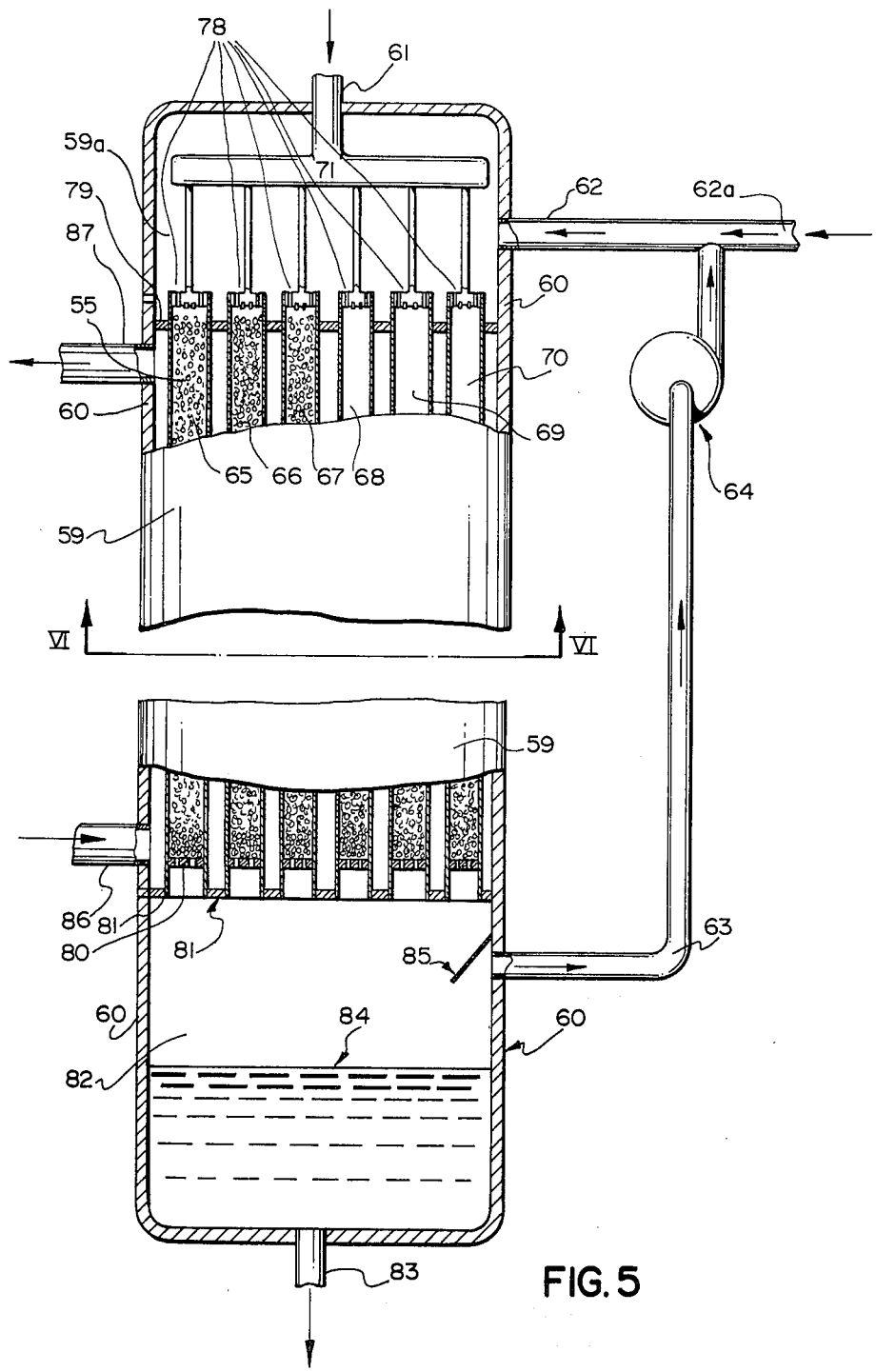
FIG. 5 is an embodiment of the invention similar to that shown in FIG. 3 except that instead of a single relatively large reactor there are a number of smaller reactors arranged in parallel.

A third preferred embodiment of the invention is shown in FIG. 5. The apparatus in FIG. 5 is a logical extension of the apparatus in FIG. 3 to the case where it is desirable to have more than one tube containing catalyst particles, and to have all the tubes containing catalyst within one reactor vessel. The situation arises, for instance, in conducting a highly exothermic hydrogenation reaction at a large liquid feed rate. In order to keep the temperature within the catalyst bed at an acceptable value, it is necessary to remove heat rapidly through the wall of the tube containing the bed. To effect the heat removal satisfactorily the tube diameter cannot be arbitrarily large.

With reference to FIG. 5, the reactor is now shown at 59, but in this instance reactor 59 contains a number of individual reactor tubes connected in parallel. In this instance six individual reactor tubes are shown denoted as 65 – 70, but the invention is not restricted to any particular number of reactor tubes. The reactor tubes 65 – 70 are mounted inside an outer shell denoted as 60. As in the case of the embodiments previously described, the present embodiment has a hydrocarbon feed conduit denoted as 61, a hydrogen feed conduit denoted as 62, a recycle conduit shown at 63 and a compressor denoted as 64, with make-up hydrogen being supplied at 62a.

In the embodiment of FIG. 5 the hydrocarbon feed conduit connects to a manifold denoted as 71 which in turn connects to distributors each denoted as 78 in each of the reactor tubes 65 – 70. The hydrogen gas entering through conduit 62 enters a plenum chamber at the upper end of reactor 59 and thence to the distributors 78. The plenum chamber denoted by 59a in reactor 59 is closed by a header or retaining plate indicated at 79 which functions to hold reactor tubes 65 – 70 firmly in place. Retaining plate 79 is particularly shown in FIG. 6, which comtemplates the use of 24 reactor tubes like tubes 65 – 70 particularly referred to. A similar header shown at 81 secures the opposite end of reactor tubes 65 – 70, and similarly forms a closed off space at the lower end of reactor 59 denoted as disengagement section 82.

Each of reactor tubes 65 – 70 has near its lower end a support grid denoted by 80 for holding the catalytic particles 48.

As in the case of the previously described embodiments, the disengagement section 82 maintains a liquid level at 84 to prevent gas escaping through the hydrogenated product exit conduit at 83. A baffle denoted by 85 prevents descending hydrogenated liquid from entering conduit 63.

In the embodiment of FIG. 5, liquid feed enters the reactor at the top through conduit 61. Manifold 71 provides a conduit for the liquid to the top of each tube 65 – 70 containing catalyst. Hydrogen enters the reactor via conduit 62 and fills the plenum chamber 59a. The hydrogen is confined within the plenum chamber by the outer shell 60 and the header shown at 79 holding the catalyst-filled tubes.

The hydrogen and hydrocarbon pass down through the catalyst beds 55 into a gas-liquid disengagement section 82. Above the liquid level 84 are gaseous hydrogen and hydrocrabon vapors, and falling liquid. The gaseous phase is contained by the outer shell 60 and by the header 81 holding the catalyst-filled tubes. Recycle hydrogen is passed through conduit 63 and compressor 64 before reentry at the top of the reactor.

Heat removal from the catalyst-filled tubes is effected by circulating a coolant through the space between the headers 79 and 81, and the outer shell 60. The coolant enters and leaves the reactor by means of tubes indicated at 86 and 87, respectively. The coolant may be a liquid, or a liquid that is vaporized.

Figure 6:
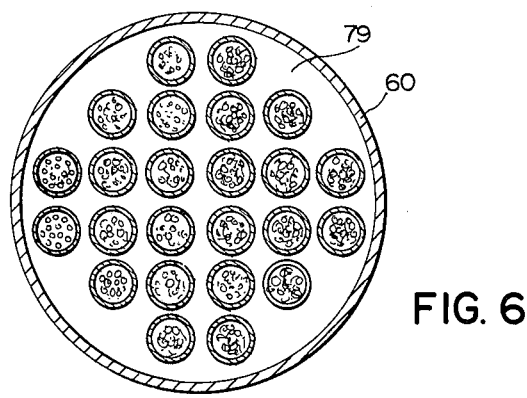
FIG. 6 shows a cross-sectional view as seen in FIG. 5 at the line VI—VI, looking upwardly; and, FIG. 7 is an embodiment of the invention similar to that shown in FIG. 4 except that instead of a single relatively large reactor there are a number of smaller reactors arranged in parallel.

The section view through the reactor at plane VI—VI is shown in FIG. 6 and indicates a typical distribution of the catalyst-filled tubes inside the reactor. To those familiar with equipment used in chemical processing, the distribution of tubes will be recognized as typical for that employed in a shell and tube heat exchanger. As is common practice in the operation of shell and tube heat exchangers, baffles may be used to achieve a desirable circulation pattern of coolant among the tubes. The headers shown at 79 and 81 prevent the coolant from entering the plenum chamber at the top or the disengagement section at the bottom of the reactor.

It should be mentioned that the functions of the manifold and the plenum chamber in the upper section of the reactor shown in FIG. 5 could easily be reversed. That is, liquid feed could be fed to the plenum chamber 59a and hydrogen could be directed to each catalyst-filled tube via a manifold.

Figure 7:
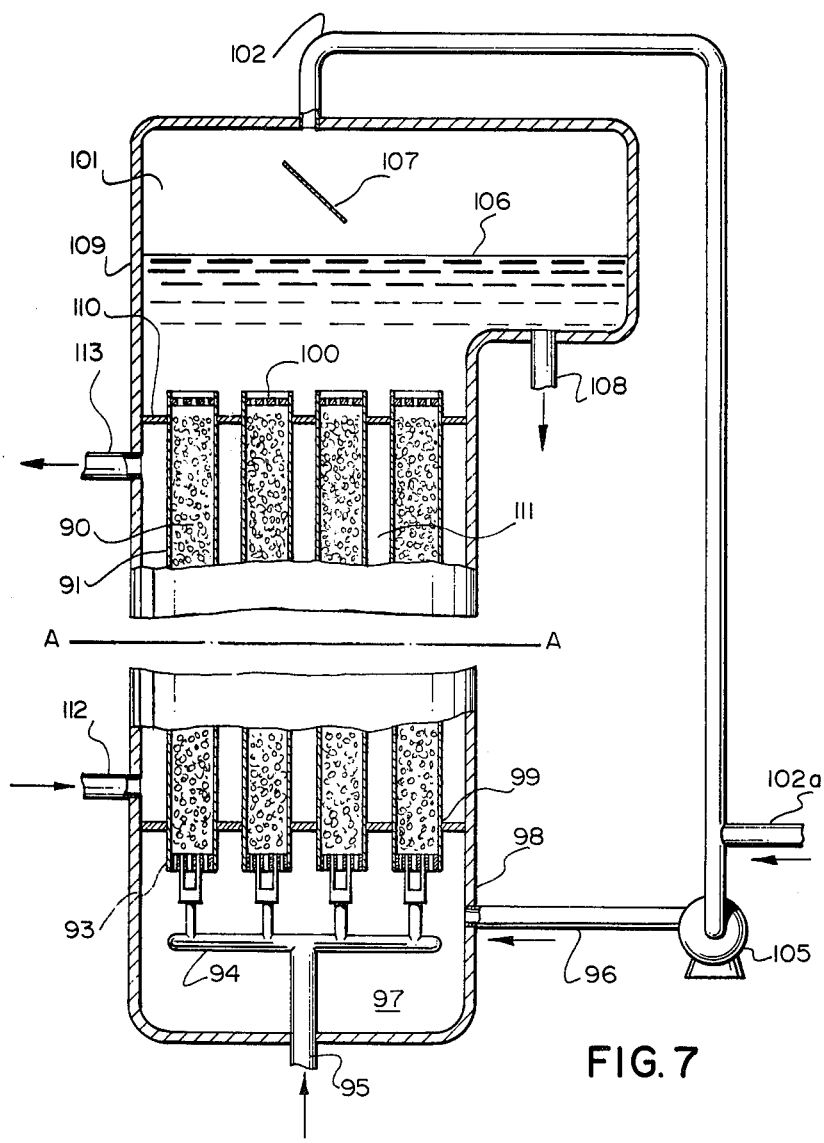

A fourth preferred embodiment of the present invention is shown in FIG. 7. This embodiment is a logical extension of the apparatus shown in FIG. 4 to the case where it is desirable to have several tubes of catalyst particles contained within a single reactor vessel. With reference to FIG. 7, we shall consider a typical bed of catalyst particles denoted by 90 contained in a typical tube shown at 91. The catalyst bed is supported by a distributor shown at 93 that is similar to item 49 in FIG. 4. The catalyst bed could also be supported on a porous plate or grid, with the distributor located immediately beneath it. Hydrocarbon feed enters the distributor via a manifold shown at 94 which in turn receives the feed via the inlet conduit shown at 95. Hydrogen enters the reactor via conduit indicated at 96 and occupies the plenum space indicated at 97. The hydrogen is contained by the reactor vessel wall denoted by 98 and header indicated at 99 that holds the catalyst-filled tubes.

Hydrogen and hydrocarbon pass upward through the catalyst-filled tubes such as tube 91 during which passage reaction occurs. Fixed at the top of each tube containing catalyst particles is a porous plate or grid denoted by 100 to prevent catalyst entrainment by the flowing fluids. Upon leaving the catalyst beds the hydrogen and hydrocarbon enter a disengagement section shown at 101. Hydrogen leaves the disengagement section through conduit indicated by 102 and is returned as recycle to the reactor. An inclined baffle plate denoted by 107 prevents liquid entrainment with recycle hydrogen. Before recycle hydrogen enters the reactor, make-up hydrogen is added via conduit shown at 102a, and the combined streams pass through a compressor shown at 105. As mentioned above, it is also possible to supply make-up hydrogen at sufficiently high pressure that its passage through compressor shown at 105 is unnecessary. The liquid level indicated by 106 in the disengagement section is maintained below baffle shown at 107 and sufficiently high that only liquid leaves through the product conduit indicated by 108. The fluids in the disengagement section 101 are contained by the vessel wall of the disengagement section shown at 109, and by the header indicated by 110 holding the catalyst-filled tubes such as tube 91.

Heat of reaction is removed by circulating coolant in the space, indicated by 111, among the catalyst-filled tubes. The coolant is prevented from entering the disengagement section at the top, and the plenum chamber at the bottom of the column by the headers 99 and 110. The coolant enters and leaves the reactor via conduits denoted by 112 and 113, respectively.

The typical arrangement of the catalyst-filled tubes in the reactor as shown in FIG. 6 is applicable to FIG. 7.

The functions of the plenum space 97 and the manifold 94 in FIG. 7 may be reversed. That is, hydrogen may be fed to the catalyst-filled tubes via a manifold, and hydrocarbon via the plenum space.

The scope of the present invention is as set forth in the appended claims but it may be of assistance in interpreting the claims if some comment is made on certain prior patents and publications that may at first sight appear to be pertinent to the present invention.

Canadian Pat. No. 815,069, Robert J. Leak and Harry J. LeBleu, June 10, 1969 describes hydrogenation in the liquid phase with catalyst particles prepared as specified in the present invention. There is no indication that Leak and LeBleu used gas and liquid flow rates as specified in the present invention, however.

The publication, B. D. Babcock et al., "Catalyzed Gas-liquid Reactions in Trickling-bed Reactors", published in A.I. Ch. E. Journal, September 1957, shows the use of a trickle bed reactor for hydrogenation with catalyst pellets having the active components only in the "external areas". However, there is no indication that the catalyst was prepared in the manner specified in the present invention, and the gas and liquid flow rates empolyed were not in the range specified in the present invention.

The publication of Y. Sato et al., "Performance of Fixed-Bed Catalytic Reactor with Co-current Gas-Liquid Flow", published in the proceedings of the First Pacific Chemical Engineering Congress, Part II, Oct. 10–14, 1972, reports the use of a packed bed reactor under the gas and liquid flow conditions recommended by the present inventor, to conduct an oxidation reaction catalyzed by the catalyst particles. In addition to the obvious difference of conducting an oxidation instead of a hydrogenation reaction, Sato et al. apparently did not prepare their catalyst particles in the manner specified in the present invention.

It will thus be seen that the present invention provides a method and apparatus for carrying out hydrogenation of hydrocarbons in the liquid state in the presence of a solid catalyst which is an improvement over the prior art method and apparatus for accomplishing similar objects.

The embodiments of the invention in which an exclusive property or privilege is claimed are defined as follows:

1. A method for carrying out hydrogenation which comprises the steps of
   introducing a liquid hydrocarbon material into a reactor at a first predetermined rate,
   introducing hydrogen gas into the reactor at a second predetermined rate,
   permitting the liquid hydrocarbon material and the hydrogen gas to mix,
   causing the mixed liquid hydrocarbon material and hydrogen gas to pass in close association with a layer of solid catalyst particles held in place in said reactor,
   the individual structure of solid catalyst particles characterized by providing an inert support member coated with a thin layer of catalytically active material, and
   removing the hydrogenated product so produced from the reactor;
   the said first predetermined rate being such that the superficial velocity of liquid hydrocarbon in the reactor is in the range of 0.5–6 cm/sec. and the liquid hourly space velocity, based on the volume by said catalytically active microporous solid, is in the range of 25 – 1000 hr$^{-1}$; and
   the said second predetermined rate being such that the superficial velocity of hydrogen gas in the reactor is in excess of 30 cm/sec.

2. A method for hydrogenation of a liquid hydrocarbon material which comprises the steps of:
   introducing at a first predetermined rate a liquid hydrocarbon material into a reactor which contains a fixed layer of solid catalyst particles which are each composed of an inert support member coated with a thin layer of catalytically active material;
   introducing hydrogen gas into the reactor at a second predetermined rate so that the liquid hydrocarbon material and the hydrogen gas are mixed together and chemically interreact to form a hydrogenated product; and
   removing the hydrogenated product from the reactor;
   said first predetermined rate being such that the superficial velocity of the liquid hydrocarbon material in the reactor ranges from 0.5 to 6 cm/sec and the liquid hourly space velocity, based on the volume occupied by said catalytically active material, ranges from 25 – 1000 hr$^{-1}$, and said second predetermined rate being such that the superficial velocity of hydrogen gas in the reactor is in excess of 30 cm/sec.

3. The method of claim 2 wherein said liquid hydrocarbon material and said hydrogen gas are introduced into said reactor to pass cocurrently through said fixed catalyst layer.

4. The method of claim 2 wherein said solid catalyst particles have a size ranging from about 5–30 millimeters.

* * * * *